United States Patent [19]

Lynch et al.

[11] 4,267,994

[45] May 19, 1981

[54] PIPE SUPPORTING APPARATUS

[76] Inventors: Paul C. Lynch, Rte. 6, Box 60A, Fairmont, W. Va. 26554; Ervin M. Driver, 312 Graveline La., Gautier, Miss. 39567

[21] Appl. No.: 31,741

[22] Filed: Apr. 20, 1979

[51] Int. Cl.³ .............................................. F16L 3/08
[52] U.S. Cl. ................................... 248/65; 248/74 R
[58] Field of Search ................. 248/58, 62, 65, 68 R, 248/74 R, 74 A, 74 B

[56] References Cited

U.S. PATENT DOCUMENTS

| | | | |
|---|---|---|---|
| 2,338,006 | 12/1943 | Morehouse | 248/74 B |
| 2,960,761 | 11/1960 | Preader | 248/65 X |
| 3,173,639 | 3/1965 | Dunn | 248/74 R X |
| 3,218,012 | 11/1965 | Volpe | 248/74 R X |
| 3,317,170 | 5/1967 | Pfaff | 52/40 X |

FOREIGN PATENT DOCUMENTS 835868  5/1960  United Kingdom ................ 228/165

*Primary Examiner*—J. Franklin Foss
*Attorney, Agent, or Firm*—Stanley J. Price, Jr.; John M. Adams

[57] ABSTRACT

A brace member having a longitudinally extending tapered body portion includes a first end portion having an expanded head of a frusto-conical shape terminating in a planar surface and a second end portion having a U-shaped member secured thereto. The planar surface of the expanded head is positioned in an abutting relation with a supporting structure, such as the metallic superstructure of an oceangoing vessel. The conical shape of the expanded head forms with the surface of the supporting structure an annular recess for receiving a weld to unite the end of the brace member securely to the supporting structure. The U-shaped member includes a semicircular base having means for securely receiving and retaining a pipe, conduit or the like in a fixed position relative to the supporting structure.

7 Claims, 8 Drawing Figures

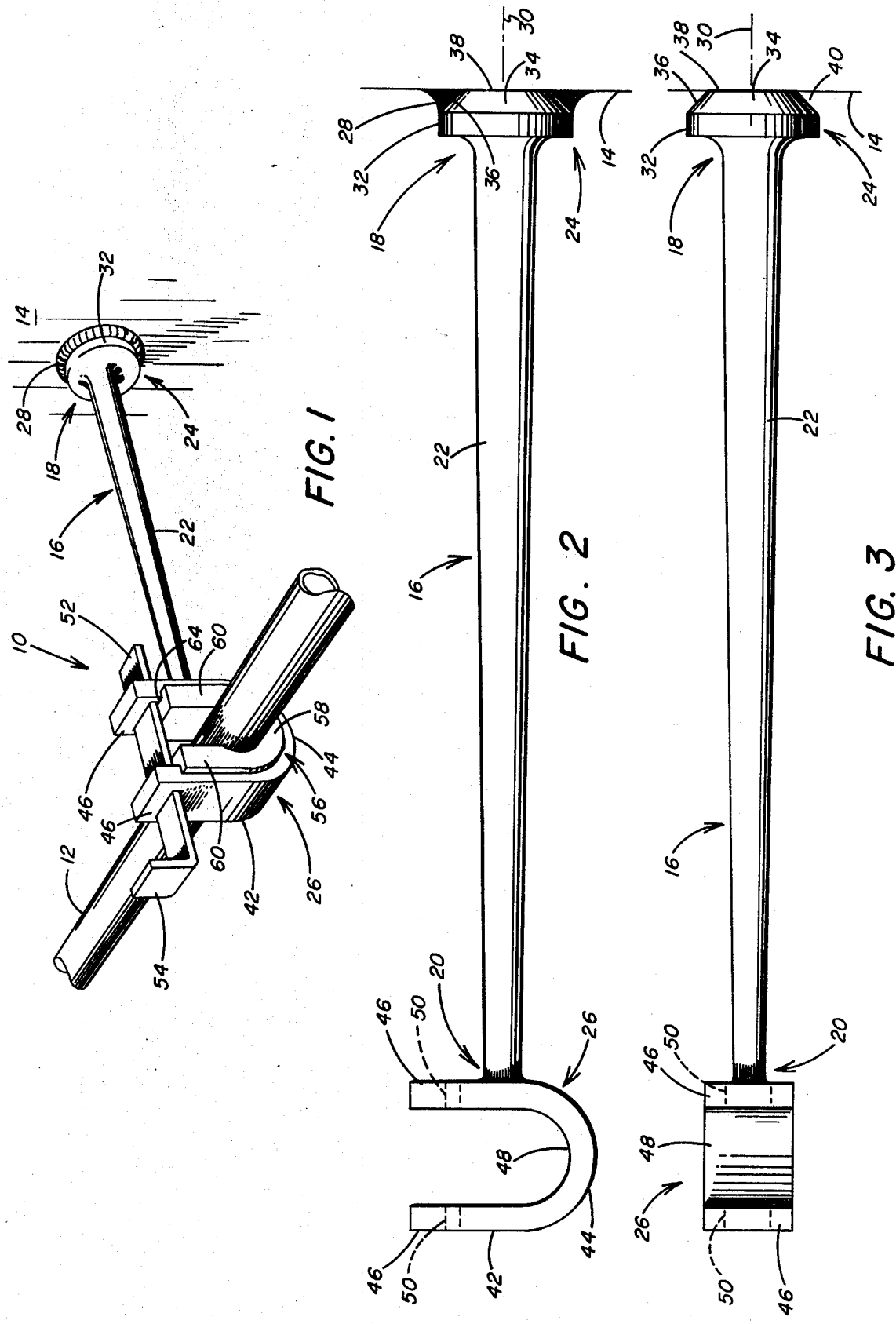

PIPE SUPPORTING APPARATUS

BACKGROUND OF THE INVENTION

1. Field of the Invention

This invention relates to an apparatus for supporting pipes, conduits and the like and more particularly to a brace member that is welded at one end portion to a supporting structure and provided at the opposite end portion with a support member for securely engaging and supporting the pipe in a fixed position relative to the supporting structure.

2. Description of the Prior Art

It is the conventional practice in an oceangoing vessel to support the piping system of the vessel by brackets or hangers that are secured to either the inside or the outside of the ship's superstructure. The brackets or hangers are connected to the respective pipes with the object of supporting the pipes against vibration to prevent noise and possible damage to the pipes, particularly when the vessel is running at high speeds or is subjected to rough seas.

The known hangers have an elongated configuration with a first end portion adapted to be connected to the pipe to support the pipe and an opposite end portion adapted to be secured to the superstructure of the vessel. The hangers are generally fabricated of steel and include a flat end portion that is welded to a metallic wall of the vessel. The currently available pipe hangers, however, are prone to failure as the result of fatigue when subjected to stress, particularly at the weld point. The known hangers are also subject to vibration which generates undesirable noise in the vessel. Furthermore, the known pipe hangers must be pretreated to accept a corrosion preventive coating, such as paint, for protection against rust due to the saline atmosphere of an oceangoing vessel.

Therefore, there is need for an improved pipe supporting apparatus that is operable in an oceangoing vessel to securely support the piping system of the vessel by welding of the apparatus to the vessel superstructure in a manner that stabilizes the pipes against vibration and resists failure by fatigue.

SUMMARY OF THE INVENTION

In accordance with the present invention there is provided apparatus for supporting a pipe-like member that includes a brace member. The brace member has a first end portion and a second with an axially tapered body portion extending between the first and second end portions. An expanded head portion extends from the first end portion. The expanded head portion has means adapted for receiving a weld to securely unite the brace member to a supporting structure. A support member extends from the second end portion for receiving the pipe-like member to securely support the pipe-like member.

The tapered body portion has a longitudinal axis and is preferably cylindrical in cross section. Most preferably the tapered body portion progressively increases in cross-sectional area from the second end portion along the longitudinal axis to the first end portion. With this arrangement the brace member tapered body portion has a minimum cross-sectional area adjacent the support member and a maximum cross-sectional area adjacent the expanded head portion which is welded to the supporting structure.

The expanded head portion of the brace member includes an annular portion and a frusto-conical portion that extends outwardly from the annular portion. The annular portion and the frusto-conical portion are coaxially aligned with the longitudinal axis of the brace member tapered body portion. The frusto-conical portion has a planar end portion having a cross-sectional area which is less than the cross-sectional area of the annular portion. The planar end portion is positioned in abutting relation with the surface of the supporting structure and forms an annular recess around the expanded head portion that extends from the annular portion along the surface of the frusto-conical portion to the supporting structure.

The annular recess is particularly adapted to receive a weld. With this arrangement a maximum surface area of the expanded head portion is available for welding to the supporting structure. Thus, the brace member is rigidly secured to the supporting structure to support the pipe-like member in a fixed position relative to the supporting structure.

Preferably, the support member that extends outwardly from the brace member second end portion is a substantially U-shaped member. The U-shaped member is positioned relative to the brace member to support the pipe-like member substantially perpendicular to the brace member and substantially parallel to the supporting structure. A resilient liner of an elastomeric material is securely received by the U-shaped member. The liner is operable to compressibly engage the pipe-like member to prevent it from moving in the U-shaped member.

The U-shaped member also includes a pair of parallel-spaced legs that extend upwardly on opposite sides of the pipe-like member. Aligned longitudinal slots extend through the legs. A pin member is received in the slots and thereby forms an enclosure with the resilient liner to securely maintain the pipe-like member in the U-shaped member.

Accordingly, the principal object of the present invention is to provide for supporting a pipe-like member adjacent a supporting structure apparatus that includes an elongated tapered body portion having an expanded, frusto-conical shaped head adapted to be welded to the supporting structure and a pipe receiving opposite end portion for rigidly supporting the pipe-like member relative to the supporting structure.

Another object of the present invention is to provide apparatus for supporting pipes and the like from the superstructure of an oceangoing vessel in which the apparatus is securely welded to the superstructure and capable of securely supporting a pipe in a fixed position relative to the superstructure.

These and other objects of the present invention will be more completely disclosed and described in the following specification, the accompanying drawings and the appended claims.

BRIEF DESCRIPTION OF THE DRAWINGS

FIG. 1 is a perspective view of the pipe supporting apparatus of the present invention, schematically illustrating a pipe, conduit, or the like supported by a U-shaped member secured to one end of a brace member that is welded at an opposite end to a supporting structure, such as a wall.

FIG. 2 is a view in side elevation of the pipe supporting apparatus, illustrating a tapered body portion having a U-shaped member secured to one end portion and an enlarged heat portion having a frusto-conical shape at the opposite end portion shown welded to a supporting structure.

FIG. 3 is a top plan view of the pipe supporting apparatus illustrated in FIG. 2 shown without the weld.

DESCRIPTION OF THE PREFERRED EMBODIMENTS

Figure 4:
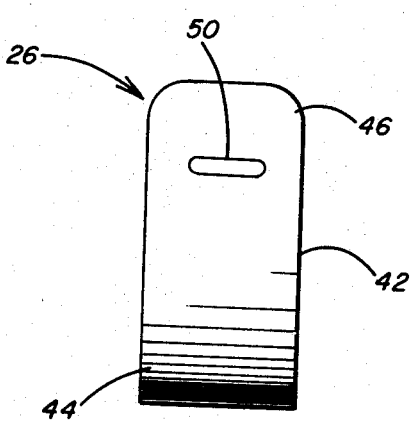
FIG. 4 is an end view of the U-shaped member of the pipe supporting apparatus, illustrating a longitudinal slot for receiving a pin to retain the pipe in place.
Figure 5:
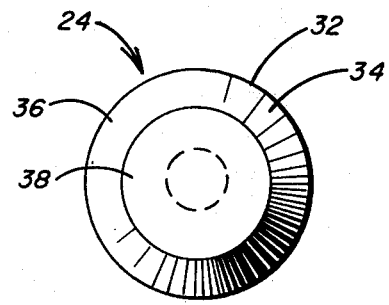
FIG. 5 is an end view of the expanded head portion of the pipe supporting apparatus, illustrating the frusto-conical surface and the planar end portion adapted for welding to the supporting structure.

Referring to the drawings and particularly to FIG. 1, there is illustrated apparatus generally designated by the numeral 10 for supporting a pipe-like member, conduit, or the like from a supporting structure 14, such as a wall, by welding the end portion of the apparatus to the supporting structure 14. This arrangement provides an efficient means for hanging in a secured manner a pipe and has particular application as will be described later in greater detail for supporting the piping system in an oceangoing vessel.

The supporting apparatus 10 includes a brace member or bracket 16 having a first end portion 18 and a second end portion 20, as illustrated in greater detail in FIGS. 2 and 3. A tapered body portion 22 extends between the first and second end portions. An expanded head portion generally designated by the numeral 24 extends from the first end portion 18, and a support device generally designated by the numeral 26 extends from the second end portion 20. The expanded end portion has a configuration particularly adapted for receiving a weld 28, as illustrated in FIGS. 1 and 2 to thereby securely unite the brace member 16 with the supporting structure 14. The support device 26 has a U-shaped configuration adapted for receiving a pipe-like member 12 to securely hold the pipe-like member relative to the supporting structure 14.

As illustrated in FIGS. 2 and 3, the expanded head portion 24 has a configuration that is particularly adapted for welding the head portion 24 to the supporting structure 14 which is a metallic material also adapted to receive a weld. The brace member tapered body portion has a longitudinal axis 30, and the expanded head portion 24 extends axially from the tapered body portion 22. The cross-sectional area of the tapered body portion increases in magnitude along the longitudinal axis 30 between the first end portion 18 and the second end portion 20.

Preferably, the tapered body portion 22 progressively increases in cross-sectional area in a direction from the second end portion 20 along the longitudinal axis 30 to the first end portion 18. Thus, with this arrangement the brace member 16 has a minimum cross-sectional area at the end portion 20 and a maximum cross-sectional area at the end portion 18 adjacent the supporting structure 14. In this manner the pipe-like member 12 is securely supported adjacent the supporting structure 14. The tapered body portion 22 increases the structural strength of the brace member 16, particularly in applications for supporting the piping system in an oceangoing vessel. The tapered configuration serves to reduce vibration that generates undesirable noise in a vessel, particularly when the vessel is navigating at high speed or in rough seas. Overall the tapered configuration of the brace member 16 increases the strength of the apparatus 10 to support pipes in a vessel.

The expanded head portion 24 includes an enlarged annular portion 32 that is formed integral with the brace member end portion 18. A frusto-conical portion 34 extends axially from the annular portion 32. The frusto-conical portion 34 has an outer surface 36 arranged to receive the weld 28 and a planar surface 38 adapted to abut the surface of the supporting structure 14. When the planar surface 38 is positioned in abutting relation with the supporting structure 14 as illustrated in FIG. 3, an annular recess 40 is formed around the expanded head portion 24 between the annular portion 32 and the supporting structure 14. The annular recess 40 contains the weld 28 and provides an increased surface area for welding the brace member end portion 18 to the supporting structure 14.

As illustrated in FIGS. 2 and 3, the frusto-conical portion 34 is defined by a circular base that is connected to the annular portion 32 and an outer end formed by the planar surface 38. The circular base and the outer end are positioned in parallel planes with the plane of the outer end being coplanar with the supporting structure 14 when the head portion 24 is welded to the supporting structure. With this arrangement, the brace member 16 is positioned to extend perpendicularly from the supporting structure 14. Thus, the frusto-conical portion 34 provides an increased surface area for welding to the supporting structure 14. The mechanical bond of the brace member 16 to the supporting structure 14 provided by the weld 28 constitutes a substantial improvement over mere contact of the flat end of a pipe hanger with the supporting structure 14.

Preferably, supporting apparatus 10 including the tapered body portion 22, the expanded heat portion 24, and the support device 26 is a unitary body of one piece construction. The composition of the supporting apparatus 10 is uniform throughout. The supporting apparatus 10 has a materials composition free of dissimilar metals to oxidize with a vessel's superstructure. In accordance with the present invention, the supporting apparatus 10 is fabricated substantially of aluminum combined with a preselected percentage of other elements.

An example composition of elements in an amount as expressed by percentage weight includes 9.5% to 10.5% silicon, 0.08% iron, 0.50% copper, 0.25% manganese, 0.45% to 0.60% magnesium, 0.20% to 0.30% chromium, 0.40% zinc, 0.10% tin, 0.20% titanium, and 0.05% to 0.15% inert material with the remainder comprising aluminum. A supporting apparatus 10 having the above composition has a minimum tensile strength of 33,000 p.s.i. and a Brinell hardness of 75. This supporting apparatus is most preferably united to the surface of the supporting structure 14 by a heliarc weld, using any standard welding rod that does not contain copper or zinc. It is also preferred to pretreat the surface of supporting apparatus 10 to accept paint without chromate or other preparations. Principally, the supporting apparatus 10 has a composition free of dissimilar metals to oxidize with the vessel's metallic superstructure in a saline atmosphere. The apparatus 10 thus does not contain steel alloys which if present would be subject to oxidation (rusting) and deterioration resulting therefrom.

Referring to FIGS. 4-8 there is illustrated, in greater detail, the support device 26 for receiving the pipe-like member 12. A substantially U-shaped member 42 is integrally formed with the brace member end portion 20. The U-shaped member 42 is connected to the brace member end portion 20 to support the pipe-like member 12 substantially perpendicular to the brace member 16 and, therefore, substantially parallel to the supporting structure 14. However, it will be apparent that modifications may be made to the connection of the U-shaped member 42 to the brace member 16 to support the pipe-like member in any desired angular relation relative to the supporting structure 14.

Figure 6:
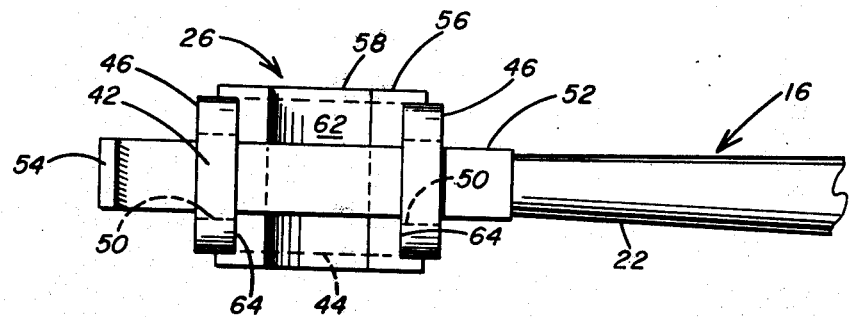
FIG. 6 is a fragmentary top plan view of the U-shaped member of the pipe supporting apparatus, illustrating a resilient liner received within the U-shaped member and the pin extending through the longitudinal slots.
Figure 7:
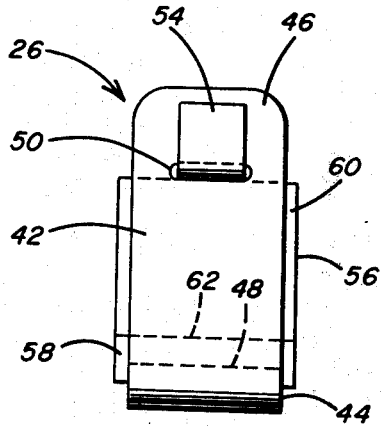
FIG. 7 is an end view of the U-shaped member illustrated in FIG. 6.
Figure 8:
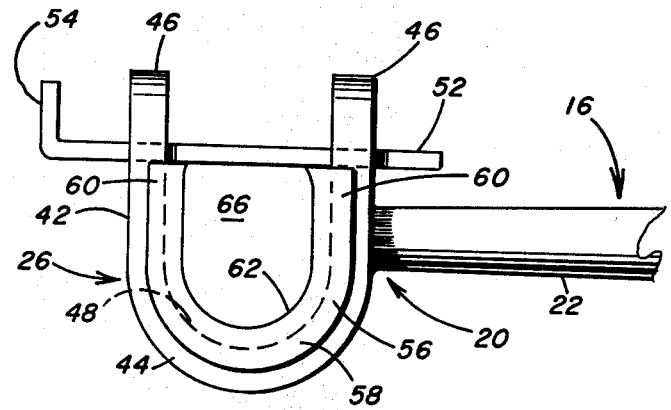
FIG. 8 is a fragmentary view in side elevation of the U-shaped member illustrated in FIG. 6.

The U-shaped member 42 is formed by a semicircular base 44 and a pair of parallel spaced legs 46 that extend vertically upwardly from the base 44. This arrangement provides a generally U-shaped recess 48, as illustrated in FIG. 2, for receiving the pipe-like member. The brace member end portion 20 is rigidly connected to one of the legs 46. Each of the legs 46 adjacent the upper end portion thereof is provided with a longitudinal slot 50. The slots 50 are aligned to receive a pin member 52. The pin member 52 is movable in the slots 50. As illustrated in FIGS. 6 and 8, the pin member 52 has a preselected length to permit it to be securely retained in the slots 50 and is provided with an upwardly bent end portion 54 to prevent the pin 52 from passing completely through the slots 50 when advanced in one direction.

Also, in accordance with the practice of the present invention the support device 26 includes a resilient liner 56. The liner is preferably fabricated of an elastomeric material and has a U-shaped configuration corresponding to the configuration of the support device 26. The resilient liner 56 has a semicircular base 58 with a pair of legs 60 extending upwardly therefrom forming a recess 62. The base 58 and legs 60 overlie and abut the base 44 and legs 46 of the U-shaped end portion 42 respectively. The liner 56 is operable to compressibly engage the pipe-like member 12 when positioned in the end portion 42, as illustrated in FIG. 1. To facilitate a secure engagement of the liner 56 within the U-shaped member 42, the liner 56 is provided with a recess 64, as illustrated in FIG. 6, that extends the length of the legs 60 and around the semicircular base 58.

Referring to FIG. 8, the pin member 52 is shown extending through the longitudinal slots 50. The undersurface of pin member 52 is urged into compressing relationship with the upper surface of the ends of the resilient liner legs 60. This engagement of the pin member 52 with the liner 56 serves to securely retain the pin 52 in the slots 50. The pin is thus prevented from being disengaged from the slots by vibration of the brace member 16. The pin member 52 and the resilient liner 56 form an enclosure 66 surrounding the pipe-like member 12 in the U-shaped member 42. Thus, the pipe-like member 12 is secured to the supporting apparatus 10 by positioning the pipe in the recess 62 in surrounding relation with the liner 56 and by extending the pin member 52 through the slots 50 in overlying relation with the pipe 12.

According to the provisions of the Patent Statutes, we have explained the principle, preferred construction and mode of operation of our invention and have illustrated and described what we now consider to represent its best embodiments. However, it would be understood that, within the scope of the appended claims, the invention may be practiced otherwise than as specifically illustrated and described.

We claim:
1. Apparatus for supporting a pipe-like member comprising,
   a brace member, said brace member having a first end portion and a second end portion with an axially tapered body portion extending between said first and second end portions,
   an expanded head portion extending from said first end portion,
   said expanded head portion being coaxially aligned with said tapered body portion,
   said expanded head portion including an annular portion having a preselected cross-sectional area,
   a frusto-conical portion extending outwardly and coaxially from said annular portion,
   said frusto-conical portion having an end portion with a cross-sectional area less than said annular portion cross-sectional area,
   said frusto-conical portion end portion having a planar surface adapted to abut the surface of a supporting structure, said frusto-conical portion and said annular portion forming an annular recess around said expanded head portion between said annular expanded head portion and the supporting structure,
   said annular recess being arranged to receive a weld and thereby provide a maximum surface of said frusto-conical portion for welded engagement with the supporting structure,
   support means extending from said second end portion for receiving the pipe-like member to securely support the pipe-like member,
   said support means including a substantially U-shaped member secured to and extending from said brace member second portion,
   a resilient liner received by said U-shaped member adapted to a compressibly engage in surrounding relation the pipe-like member, and
   a pin member removably engageable with said U-shaped member to form an enclosure with said resilient liner for securely retaining the pipe-like member in said U-shaped member in a position substantially perpendicular to said brace member.

2. Apparatus for supporting a pipe-like member as set forth in claim 1 which includes,
   said tapered body portion having a longitudinal axis,
   said tapered body portion being cylindrical in cross section, and
   said tapered body portion having a cross-sectional area of increasing magnitude along said longitudinal axis between said first and second end portions.

3. Apparatus for supporting a pipe-like member as set forth in claim 1 which includes,
   said tapered body portion having a longitudinal axis,
   said tapered body portion being cylindrical in cross section, and
   said tapered body portion progressively increasing in cross-sectional area from said second end portion along said longitudinal axis to said first end portion.

4. Apparatus for supporting a pipe-like member as set forth in claim 1 which includes,
   said tapered body portion having a longitudinal axis, and said expanded head portion extending axially from said tapered body portion.

5. Apparatus for supporting a pipe-like member as set forth in claim 1 in which,
   said frusto-conical portion is defined by a circular base and an outer end,
   said base and said outer end being positioned in substantially vertical planes with the plane of said outer end being coplanar with the supporting structure, and
   said frusto-conical portion planar surface adapted to be united with the supporting structure by the formation of a weld surrounding said frusto-conical portion between said base and said outer end.

6. Apparatus for supporting a pipe-like member as set forth in claim 1 in which,
   said U-shaped member is positioned relative to said brace member to support the pipe-like member substantially parallel to the supporting structure.

7. Apparatus for supporting a pipe-like member as set forth in claim 1 which includes,
   said apparatus having a materials composition of preselected elements free of elements oxidizable with the elements of the supporting structure to prevent oxidation of said apparatus and to facilitate welding of said expanded head portion to a supporting structure.

* * * * *